(12) United States Patent
Boltz et al.

(10) Patent No.: US 12,600,654 B2
(45) Date of Patent: Apr. 14, 2026

(54) SYSTEMS AND METHODS FOR BIOLOGICAL TRANSFORMATION, CONCENTRATION, AND RECOVERY OF SELENIUM FROM WASTEWATER

(71) Applicants: ARIZONA BOARD OF REGENTS ON BEHALF OF ARIZONA STATE UNIVERSITY, Scottsdale, AZ (US); REGENTS OF THE UNIVERSITY OF MICHIGAN, Ann Arbor, MI (US); BOARD OF REGENTS, THE UNIVERSITY OF TEXAS SYSTEM, Austin, TX (US)

(72) Inventors: Joshua Boltz, Tempe, AZ (US); Bruce Rittmann, Tempe, AZ (US); Glen Daigger, Ann Arbor, MI (US); Lynn Katz, Austin, TX (US)

(73) Assignees: Arizona Board of Regents on Behalf of Arizona State University, Scottsdale, AZ (US); Regents of the University of Michigan, Ann Arbor, MI (US); Board of Regents, the University of Texas System, Austin, TX (US)

( * ) Notice: Subject to any disclaimer, the term of this patent is extended or adjusted under 35 U.S.C. 154(b) by 0 days.

(21) Appl. No.: 18/255,858

(22) PCT Filed: Dec. 3, 2021

(86) PCT No.: PCT/US2021/061900
§ 371 (c)(1),
(2) Date: Jun. 2, 2023

(87) PCT Pub. No.: WO2022/120237
PCT Pub. Date: Jun. 9, 2022

(65) Prior Publication Data
US 2024/0101456 A1 Mar. 28, 2024

Related U.S. Application Data

(60) Provisional application No. 63/121,540, filed on Dec. 4, 2020.

(51) Int. Cl.
*C02F 9/00* (2023.01)
*B01D 71/02* (2006.01)
(Continued)

(52) U.S. Cl.
CPC ............... *C02F 9/00* (2013.01); *B01D 71/02* (2013.01); *C02F 2003/001* (2013.01);
(Continued)

(58) Field of Classification Search
None
See application file for complete search history.

(56) References Cited

U.S. PATENT DOCUMENTS 6,033,572 A 3/2000 Yano et al.
7,378,022 B2 5/2008 Lupton et al.
(Continued)

FOREIGN PATENT DOCUMENTS

WO 2021207039 10/2021

OTHER PUBLICATIONS

Tan Lea Chua, Papirio Stefano, Luongo Vincenzo, Nancharaiah Yarlagadda V., Cennamo Paola, Esposito Giovanni, Van Hullebusch Eric D., Lens Piet N.L., "Comparative performance of anaerobic attached biofilm and granular sludge reactors for the treatment of model mine drainage wastewater containing selenate, sulfate and nickel", Chemical Engeneering Journal, Elsevier, Amsterdam, NL, Amsterdam, NL , (Aug. 1, 2018), vol. 345, doi:10.1016/j.cej.2018.03.177, ISSN 1385-8947, pp. 545-555, XP055941260 [A] 6-10, 24/(13-14, 16-17),25/(24/(13-14.
(Continued)

*Primary Examiner* — Peter Keyworth
(74) *Attorney, Agent, or Firm* — Rodney J. Fuller; FULLER IP LAW LLC

(57) ABSTRACT

The present invention relates to methods for biological wastewater treatment for Se control in Se-laden wastewater.
(Continued)

The Se contaminants in the wastewater include the Se oxyanions selenate ($SeO_4^{2-}$) and selenite ($HSeO_3^-$), which are biochemically reduced and transformed to elemental selenium ($Se^0$) by microorganisms through anaerobic biological reduction. The resulting $Se^0$ is entrained in the biomass, which is further processed to enable the efficient recovery of concentrated $Se^0$.

10 Claims, 4 Drawing Sheets

(51) Int. Cl.

| | |
|---|---|
| *C02F 3/00* | (2023.01) |
| *C02F 3/12* | (2023.01) |
| *C02F 3/28* | (2023.01) |
| *C02F 11/127* | (2019.01) |
| *C02F 11/15* | (2019.01) |
| *C02F 101/10* | (2006.01) |

(52) U.S. Cl.
CPC .......... *C02F 3/1273* (2013.01); *C02F 3/2853* (2013.01); *C02F 11/127* (2013.01); *C02F 11/15* (2019.01); *C02F 2101/106* (2013.01); *C02F 2301/046* (2013.01)

(56) References Cited

U.S. PATENT DOCUMENTS

| | | | | | |
|---|---|---|---|---|---|
| 10,370,274 | B2 | 8/2019 | Liu et al. | | |
| 2008/0277336 | A1* | 11/2008 | Dvorak | .................. | A01C 3/023 |
| | | | | | 210/603 |
| 2011/0011798 | A1 | 1/2011 | Borg | | |
| 2012/0152761 | A1 | 6/2012 | Pickett | | |
| 2013/0105391 | A1 | 5/2013 | Friese | | |
| 2013/0153493 | A1* | 6/2013 | Young | ................ | B01D 63/0241 |
| | | | | | 210/615 |
| 2013/0248443 | A1 | 9/2013 | Guan | | |
| 2013/0260444 | A1 | 10/2013 | Jin | | |
| 2014/0263043 | A1 | 9/2014 | Mehta et al. | | |
| 2015/0151995 | A1 | 6/2015 | Pickett et al. | | |
| 2016/0304369 | A1* | 10/2016 | Xin | ......................... | C02F 3/303 |
| 2017/0158535 | A1 | 6/2017 | Hageman et al. | | |
| 2017/0313608 | A1 | 11/2017 | Peterson | | |
| 2019/0092667 | A1 | 3/2019 | Chidambaran | | |

OTHER PUBLICATIONS

Ya N et al., "High-rate microbial selenate reduction in an up-flow anaerobic fluidized bed reactor (FBR)", Science of the Total Environment, (Sep. 14, 2020), vol. 749, doi:10.1016/j.scitotenv.2020.142359, pp. 1-11, XP086313894.

Boltz, et al., "Selenium, Sulfur, and Nitrogen in a Common Aquatic Environment," 2021, Chapter 4 of "Environmental Technologies to Treat Selenium Pollution: Principles and Engineering." doi: 10.2166/9781789061055_0145.

Cupp-Sutton, K. A., & Ashby, M. T. (2016). "Biological chemistry of hydrogen selenide." Antioxidants, 5(4), 42.

Dobias, J., Suvorova, E. I., & Bernier-Latmani, R. (2011). "Role of proteins in controlling selenium nanoparticle size." Nanotechnology, 22(19), 195605.

40 CFR Part 423 (Dec. 14, 2020): URL: https://www.ecfr.gov/on/2020-12-14/title-40/part-423.

Gupta, U. C., & Gupta, S. C. (2000). "Selenium in soils and crops, its deficiencies in livestock and humans: implications for management." Communications in soil science and plant analysis, 31(11-14), 1791-1807.

Reamer, D. C., & Zoller, W. H. (1980). "Selenium biomethylation products from soil and sewage sludge." Science, 208(4443), 500-502.

Sinharoy, A., Saikia, S., & Pakshirajan, K. (2019). "Biological removal of selenite from wastewater and recovery as selenium nanoparticles using inverse fluidized bed bioreactor." Journal of Water Process Engineering, 32, 100988.

Sinharoy, A., & Lens, P. N. (2020). "Biological removal of selenate and selenite from wastewater: options for selenium recovery as nanoparticles." Current Pollution Reports, 6(3), 230-249.

Staicu, L. C., Van Hullebusch, E. D., & Lens, P. N. (2015). "Production, recovery and reuse of biogenic elemental selenium." Environmental chemistry letters, 13, 89-96.

Zhang, W., Chen, Z., Liu, H., Zhang, L., Gao, P., & Li, D. (2011). "Biosynthesis and structural characteristics of selenium nanoparticles by Pseudomonas alcaliphila." Colloids and Surfaces B: Biointerfaces, 88(1), 196-201.

Schulz, K. J. (Ed.). (2017). "Critical mineral resources of the United States: economic and environmental geology and prospects for future supply." Geological Survey.

* cited by examiner

SYSTEMS AND METHODS FOR BIOLOGICAL TRANSFORMATION, CONCENTRATION, AND RECOVERY OF SELENIUM FROM WASTEWATER

RELATED APPLICATIONS

This application claims the benefit of and priority to U.S. provisional patent application 63/121,540, filed Dec. 4, 2020, the entirety of the disclosure of which is hereby incorporated by this reference thereto.

TECHNICAL FIELD

The disclosure relates to systems and methods for the treatment of selenium-laden wastewater and the recovery of elemental selenium, which is a by-product of biological wastewater treatment.

BACKGROUND

Selenium is a valued resource of limited quantity. Notably, the soils in significant regions of New Zealand, Denmark, Finland, China, and Canada are selenium deficient (Gupta and Gupta 2000). Selenium has been used for manganese electrolysis and in the industrial production of glass, pigments, alloys, lithium-selenium batteries, solar cells, and photoconductors. In glass manufacturing, selenium may be utilized to de-colorize the green tint that is caused by iron impurities and to reduce solar-heat transmission in architectural plate glass. Cadmium sulfoselenide pigments may be used to produce a ruby-red color in ceramics, glass, and plastics. Selenium may additionally be used in blasting caps; in catalysts to enhance selective oxidation; in copper, lead, and steel alloys to improve machinability; in the electrolytic production of manganese to increase yields; in gun bluing for corrosion resistance and improved aesthetics; in plating solutions for improved appearance and durability; in rubber compounding chemicals as a vulcanizing agent; and in thin-film photovoltaic copper-indium-gallium-diselenide (CIGS) solar cells.

In addition to commercial and industrial applications, trace amounts of selenium are essential for several cellular functions. Selenium is a component of the antioxidant enzymes glutathione peroxidase and thioredoxin reductase which indirectly reduce certain oxidized molecules in animals and some plants. Selenium also is found in three deiodinase enzymes that convert one thyroid hormone to another. A selenium deficiency in animals can lead to reproductive disorders, birth defects, and has been linked to thyroid disorder. While suitable substitutes exist for many industrial applications, selenium has no replacement for maintaining healthy cellular activity and is an ingredient in many multivitamins, dietary supplements, infant formula, and fertilizers.

Primary selenium is refined from anode residue that results from the electrolytic refining of copper. Consequently, selenium availability is affected by copper supply, along with the number of facilities that recover selenium. Selenium reserves are based on identified copper deposits and the average selenium content in these copper deposits. Coal typically has a selenium content in the range of 0.5 to 12 parts per million, or approximately 80 to 90 times the average selenium content of copper deposits. However, selenium recovery from coal processing, although technically feasible, is not economical by means of existing technologies (Stillings 2019).

While selenium is a valued material and essential trace element for all living organisms, toxic quantities of selenium may exist in ecosystems due to human activity. Selenium-laden wastewater can originate from mining and mineral processing, steam electric-power generation, irrigated agriculture in seleniferous soils, and oil and gas industrial activities. Consequently, selenium is a water pollutant that is regulated by the United States EPA.

Using the authority of the Clean Water Act (CWA), under Title 40 of the Code of Federal Regulations (CFR) Part 423, the US EPA established effluent limit guidelines (ELG) for wastewater discharges emanating from steam electric-power generating facilities. For most existing steam-electric generating units, specified maximum average daily concentrations during any consecutive 30-day period are 29 μg Se/L for the selenium concentration remaining in flue gas desulfurization (FGD) wastewater (EPA 2020). Typical selenium oxyanion concentrations are in the order of 1 to 1,000 μg Se/L. Often, the sources of selenium are the oxyanions selenate ($SeO_4^{2-}$) and/or selenite ($HSeO_3^-$). Therefore, significant potential exists for coupling the treatment of selenium-laden wastewaters with its concentration and recovery from the wastewater.

SUMMARY

The present disclosure is directed to methods of recovering selenium from wastewater, e.g., recovered as elemental selenium.

In some embodiments, the method comprises providing an influent wastewater comprising selenium oxyanions to a biological wastewater treatment system; converting the selenium oxyanions into elemental selenium, wherein the biological wastewater treatment system converts the selenium oxyanions into elemental selenium and produces a waste sludge; and recovering elemental selenium from the waste sludge, wherein an elemental selenium-biomass separation unit separates the elemental selenium from the biomass. The waste comprises biomass and elemental selenium.

In other embodiments, the method comprises the steps of: providing an influent wastewater comprising selenium oxyanions to a biological wastewater treatment system; converting the selenium oxyanions into elemental selenium, wherein the biological wastewater treatment system converts the selenium oxyanions into elemental selenium and produces a waste sludge that comprises biomass and the elemental selenium; and transferring the sludge to a biomass processing unit, wherein the biomass processing unit reduces the total mass of the waste sludge to produce a processed waste sludge. Compared to the waste sludge, the mass of the elemental selenium is unchanged in the processed waste sludge. The method further comprises returning the processed waste sludge from the biomass processing unit to the biological wastewater treatment system, wherein elemental selenium is further agglomerated in the waste sludge to produce a sludge with concentrated elemental selenium, and then recovering elemental selenium from the sludge comprising concentrated elemental selenium with an elemental selenium-biomass separation unit. The elemental selenium-biomass separation unit substantially separates elemental selenium from the biomass.

In one aspect, biomass is returned to the biological wastewater treatment system from the biomass processing unit. Then, selenium-rich sludge is periodically removed, or wasted, from the biological wastewater treatment system.

In one embodiment, the biological wastewater treatment system comprises an anaerobic biofilm membrane bioreactor (AnBfMBR).

In one embodiment, the biomass in the biomass processing unit is subjected to one or more treatments selected from a group that may include, but is not limited to: a hydrolysis reaction, an oxidation reaction, a reduction reaction, or combinations thereof. In another embodiment, the biomass in the biomass processing unit is subjected to one or more treatments selected from a group that may include, but is not limited to: ozonation, thermal hydrolysis, ultrasound, electrical fields, mechanical shearing, aerobic digestion, anaerobic digestion, or combinations thereof. In an embodiment, a biomass processing unit reduces the biomass while the mass of elemental selenium is unaffected.

In some implementations, the influent wastewater contains sufficient macro-nutrients and organic electron donor(s). In one embodiment, macro-nutrients are added to the influent wastewater, wherein the macro-nutrients are selected from a group that may include, but is not limited to: C, N, P, and S. In another embodiment, an organic electron donor is added to the influent wastewater.

DETAILED DESCRIPTION

Figure 1:
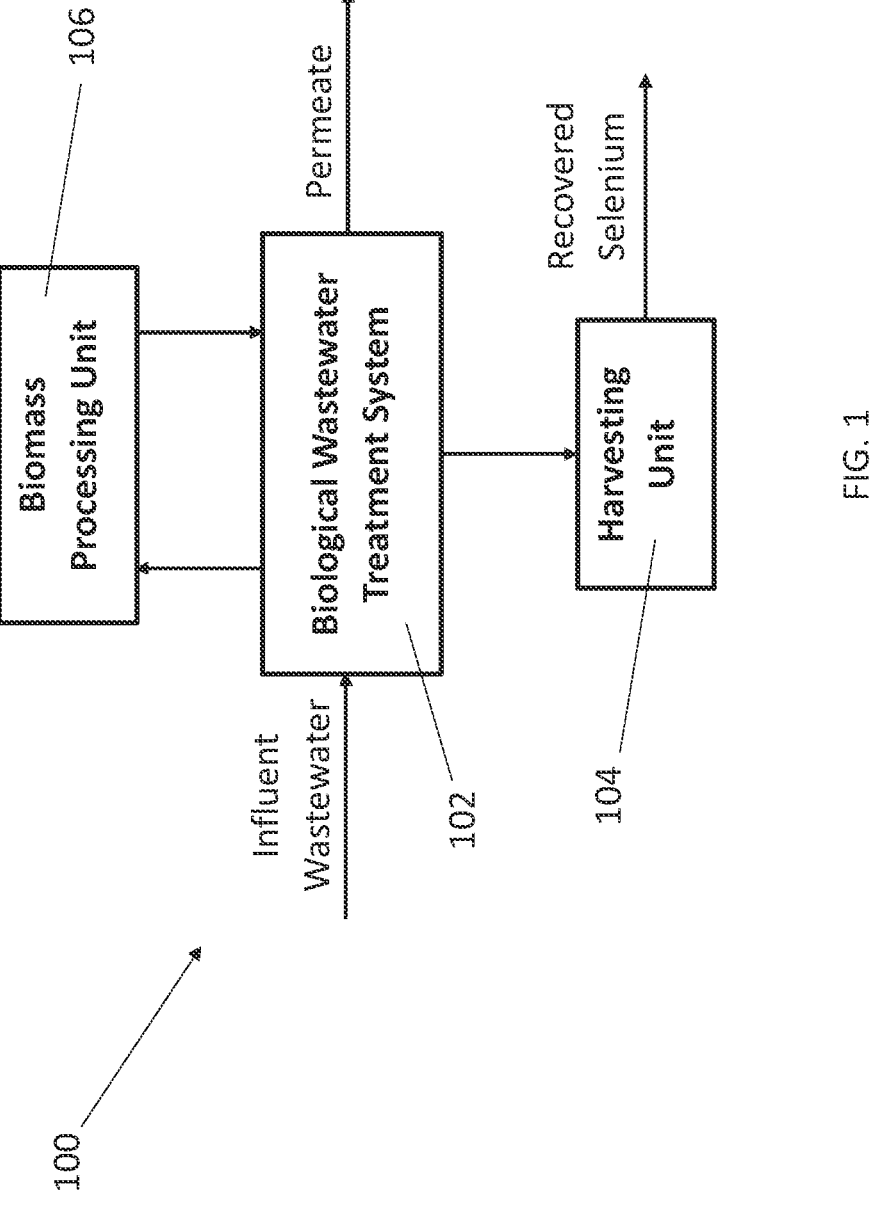
FIG. 1 depicts, in accordance with certain embodiments, a process for the biological transformation of selenium oxyanions into elemental selenium, concentration of elemental selenium in biomass, and separation of elemental selenium from biomass.

Detailed aspects and applications of the invention are described below in the drawing and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth to provide a thorough understanding of the various aspects of the invention. It will be understood, however, by those skilled in the relevant arts, that the present invention may be practiced without these specific details. It should be noted that there are many different and alternative configurations, devices and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

As used herein, the term "influent wastewater" refers to any water containing, but is not limited to, the oxyanions selenate and/or selenite that are to be substantially transformed into elemental selenium for any variety of reasons. Influent wastewater may be agricultural wastewater, municipal wastewater, steam-power generation wastewater, mining wastewater, refinery wastewater, and other types of wastewater.

As used herein, the term "biological wastewater treatment system" refers to a bioreactor and liquid-solid separation that transforms selenate and/or selenite present in influent wastewater to elemental selenium, which is predominantly retained in the biomass. The biological wastewater treatment system utilizes bacteria, including suspended growth and/or biofilms, to biochemically transform contaminants in influent wastewater. This may be done in both an anaerobic and an aerobic environment. The biological wastewater treatment system can use a variety of reactors, for example, an anaerobic biofilm membrane bioreactor (AnBfMBR), anaerobic granular sludge reactor, biologically active filter, fluidized bed reactor, or moving bed biofilm reactor.

As used herein, the term "liquid-solid separation" refers to any device employed to substantially separate undissolved, or suspended, solids from a liquid such as water. Such devices include, but are not limited to, membranes (ceramic or polymeric), granular media, gravity, and sedimentation.

As used herein, the term "suspended growth" refers to a biological floc or granule, that is, a flocculent or granular mass of microorganisms (as bacteria) suspended in water. A floc is a relatively open structure when compared with a granule. Their suspension in a liquid, such as water, is mixing dependent.

As used herein, the term "biofilm" refers to an accumulation of microorganisms (in a relatively dense layer) on a substratum. The biofilm substratum may be any surface that allows biofilm growth and may include particles such as sand, non-biodegradable bacterial materials, and synthetic surfaces formed from, for example, polystyrene or high-density polyethylene.

As used herein, the term "biomass" refers to the organic and inorganic particulate matter contained in the biological process and includes particulate matter consisting of bacteria and other microorganisms, microorganism decay products, inorganic particles, other particulates, or any combination thereof.

As used herein, the term "sludge" refers to compacted organic and inorganic particulate matter suspended in a bioreactor effluent or separated therefrom using liquid-solid separation. The particulate matter may contain suspended growth, detached biofilm fragments, inorganic particles, elemental selenium, other particulates, or any combination thereof. Typically, sludge is compacted by liquid-solid separation processes where the suspended growth, and other particulate matter, is separated from the bioreactor effluent. In some embodiments, a portion of the sludge and water is returned to the bioreactor—via internal recirculation—for even distribution of the suspended growth and/or the return of partially treated water to a zone for further treatment. In order to maintain a desired and stable mass of suspended growth (typically valuated using a stable total suspended-solids concentration), a portion of the sludge is removed, or wasted, from the biological wastewater treatment system of at a rate equivalent to the rate of bacterial growth, or yield. The "waste sludge" may be subjected to further treatment(s)

such a thickening, digestion, dewatering, and/or other technologies that are collectively referred to as solids management.

As used herein, the term "permeate" refers to the water exiting the biological wastewater treatment system with reduced concentrations of selenate and selenite.

As used herein, the term "biomass processing" refers to any unit that substantially reduces biomass while leaving the mass of elemental selenium unaffected. Biomass processing may include, but is not limited to, ozonation, thermal hydrolysis, ultrasound, electrical fields, mechanical shearing, aerobic digestion, anaerobic digestion, or combinations thereof.

As used herein, the term "processed waste sludge" refers to biomass processing unit effluent, which is characterized by substantially reduced biomass and a mass of selenium that is unaffected when compared with the biomass processing unit influent, which is waste sludge.

As used herein, the term "elemental selenium-biomass separation" refers to any unit that substantially separates elemental selenium and biomass, whether it be by physical, chemical, thermal, or mechanical means.

As used herein, the term "dimension" refers to a measurement of length, width, height, or any other distance measurement relating to the physical size of an object, where the measurement is taken between the two most extreme points of the object along one axis.

As used herein, the term "solids-residence time" refers to an amount of time that a particular solid spends within the selenium recovery wastewater treatment system.

Disclosed herein are a selenium recovery wastewater treatment system 100 and a method of recovering elemental selenium from selenium-laden wastewater. The method combines biological and physical processes, and in some aspects, also chemical processes, to transform selenium oxyanions into elemental selenium, concentrate the elemental selenium in biomass, and separate the biomass and elemental selenium. The system 100 for recovering elemental selenium from selenium-laden wastewater comprises a biological wastewater treatment system 102, which may be a bioreactor, and a harvesting unit 104. As a result of the disclosed methods and systems, elemental selenium accumulates in the biological wastewater treatment system 102 in a fashion that results in elemental selenium particles that are more easily separated from the biomass.

Figure 2:
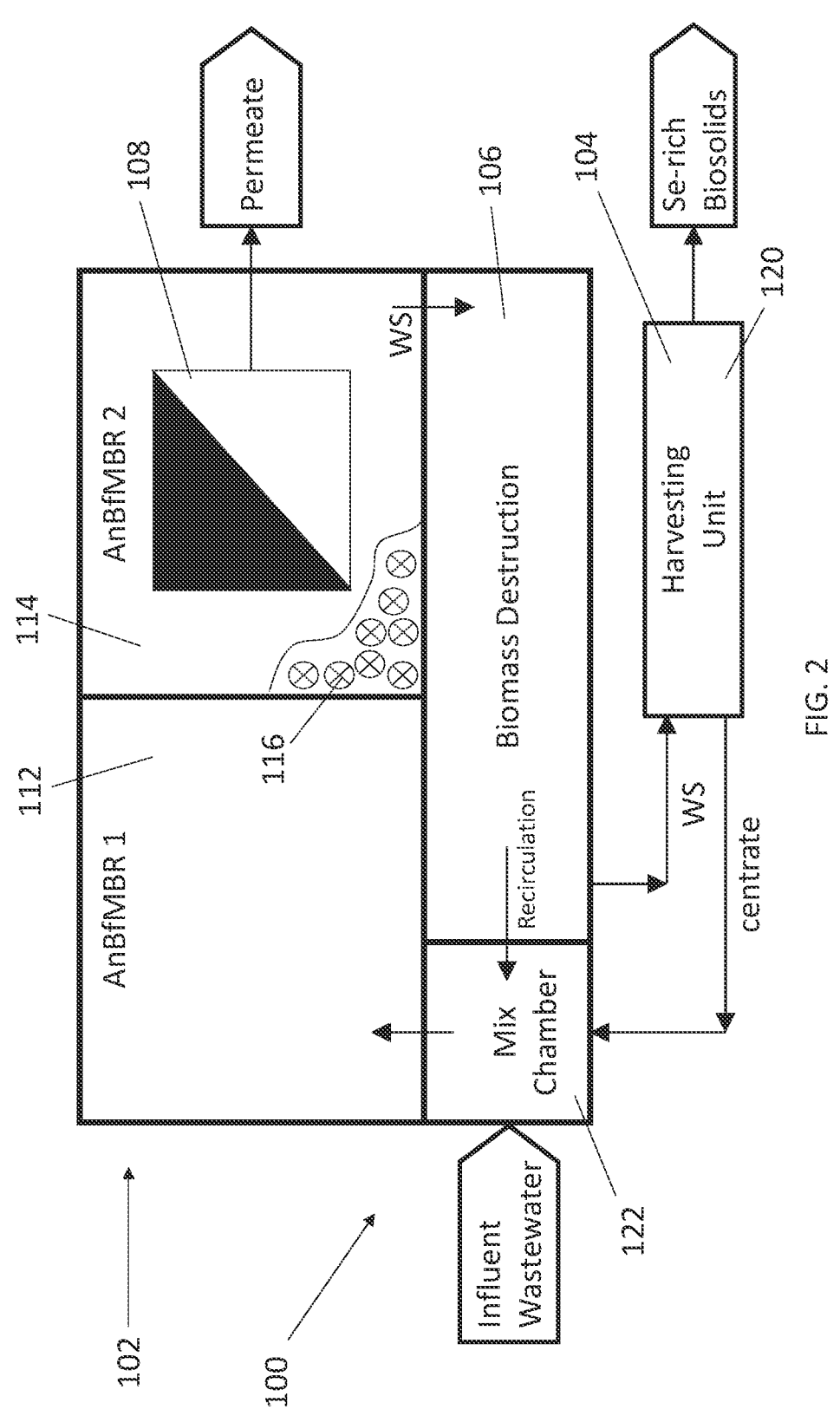
FIG. 2 depicts, in accordance with certain embodiments, a schematic of a biological wastewater treatment system for the biological transformation of selenium oxyanions into elemental selenium, concentration of elemental selenium in biomass, separation of elemental selenium from biomass, and recirculation of biomass and centrate back into the beginning of the process.

As shown in FIGS. 1 and 2, an influent wastewater enters the biological wastewater treatment system 102. The biological wastewater treatment system 102 transforms selenium oxyanions in the influent wastewater to elemental selenium and produces waste sludge comprising water, biomass, and elemental selenium. The elemental selenium is predominantly entrained in the biomass. In some aspects, the influent wastewater comprises sufficient concentrations of macro-nutrients (for example, C, N, P, and S), micronutrients (for example, Se), and/or an organic electron donor (for example, molasses, acetate, methanol, ethanol, or proprietary substrates such as MicroC). In some embodiments, macro-nutrients, micro-nutrients, and an organic electron donor are added to the influent wastewater to enable biological processes.

Periodically, waste sludge is withdrawn from the biological wastewater treatment system 102 and sent to the harvesting unit 104 where elemental selenium is substantially separated from biomass and water. In some aspects, the biological wastewater treatment system 102 has an effluent from which sludge is sent to the harvesting unit 104 where elemental selenium is substantially separated from biomass and water. The biological wastewater treatment system 102 also has a second effluent stream which is the permeate.

A wide variety of processes can be used for the biological transformation of selenium oxyanions, and the biological wastewater treatment system 102 can be any system that is capable of converting selenium oxyanions into elemental selenium. In some embodiments, selenium oxyanions are biochemically transformed into elemental selenium through anaerobic biological reduction reactions. In a non-limiting embodiment, the unit for the biological wastewater treatment system 102 involves a system as disclosed in International PCT Application No. PCT/US21/25666 (the contents of which are incorporated herein by reference in its entirety), which comprises a nonporous hollow-fiber membrane inoculated with hydrogen-autotrophic bacteria in the presence of hydrogen gas. In another embodiment, the biological wastewater treatment system 102 comprises an AnBfMBR as disclosed in International PCT Application No. PCT/US2021/061893 (the contents of which are incorporated herein by reference in its entirety). The AnBfMBR comprises a biofilm carrier on which biofilms grow and a ceramic membrane for liquid-solid separation prior to permeate leaving the biological wastewater treatment system 102.

Figure 3:
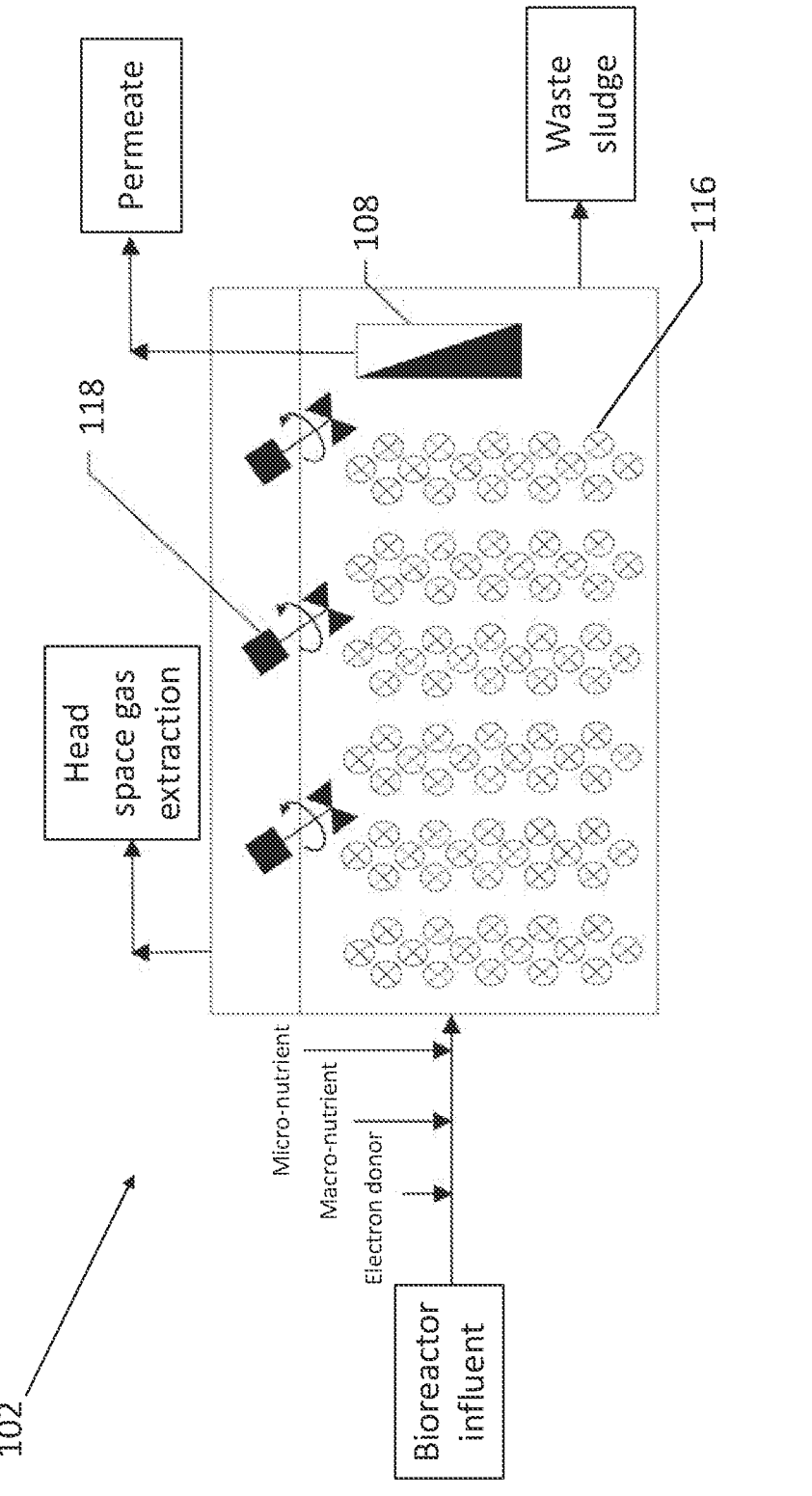
FIG. 3 depicts, in accordance with certain embodiments, a schematic of a biofilm membrane bioreactor system with biofilm carriers suspended in the bioreactor.
Figure 4:
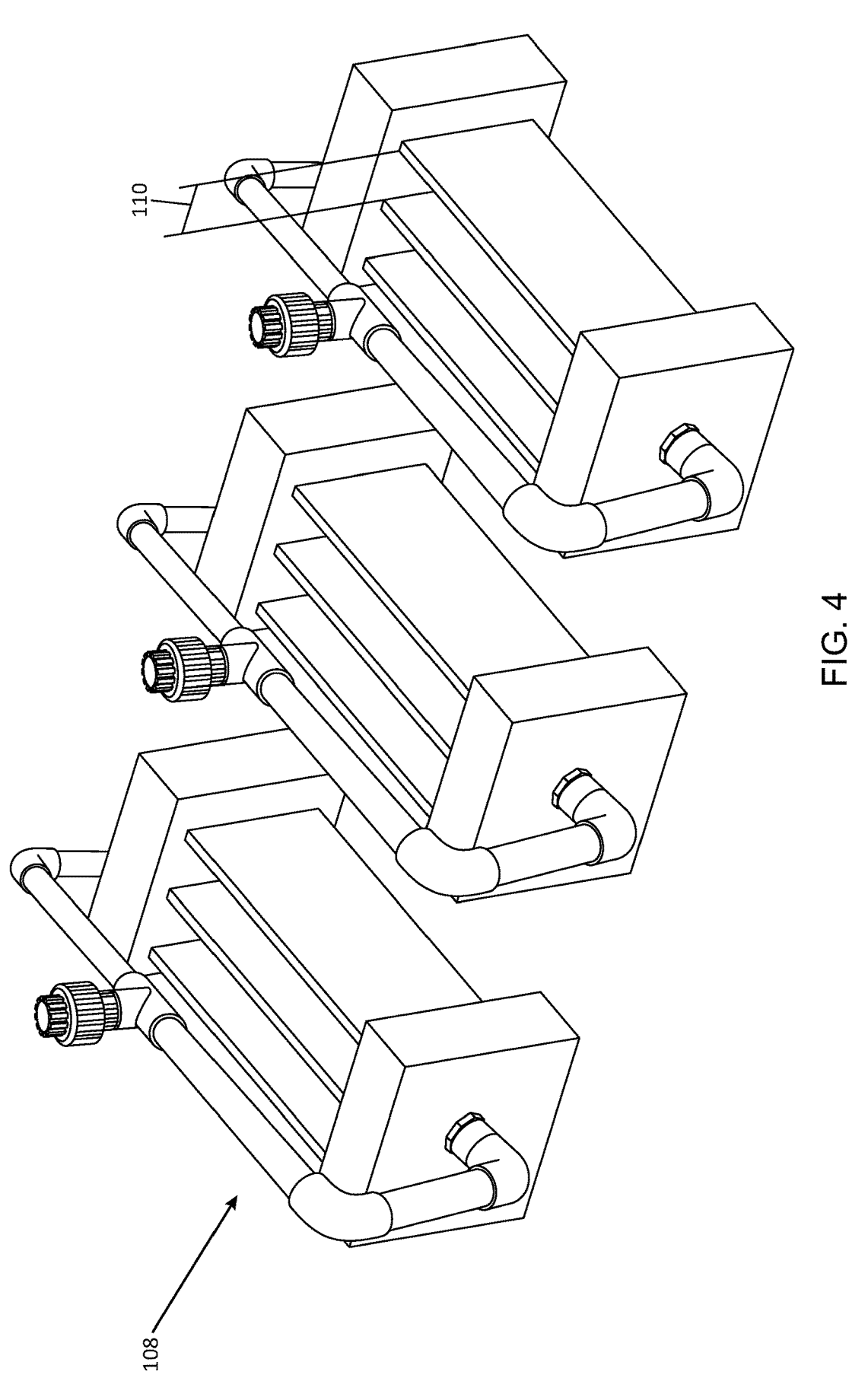
FIG. 4 depicts, in accordance with certain embodiments, membrane filters with a membrane gap between each of the membrane filters.

The biological wastewater treatment system 102 may be configured to receive and process wastewater comprising selenium oxyanions, including selenate and selenite, as mentioned above. The biological wastewater treatment system 102 may be aerobic or anaerobic. As shown in FIGS. 2 and 3, a membrane filter 108 may be used in conjunction with the biological wastewater treatment system 102 to filter the wastewater and generate permeate. In some embodiments, the membrane filter 108 is at least two membrane filters 108 (see FIG. 4). The membrane filters 108 may be formed of a ceramic material and may be positioned within the biological wastewater treatment system 102. Other materials are also possible. Each membrane filter 108 may be separated from adjacent membrane filters 108 by a membrane gap 110 (see FIG. 4). In some embodiments, the biological wastewater treatment system 102 is partitioned into a first zone 112 and a second zone 114, as shown in FIG. 2. In such an embodiment, the membrane filters 108 may be located within the second zone 114 of the biological wastewater treatment system 102. The biological wastewater treatment system 102 may also have a plurality of biofilm carriers 116 suspended within the biological wastewater treatment system 102 surrounding the membrane filters 108. The plurality of biofilm carriers 116 may be configured to scour the membrane filters 108 to maintain cleaner membrane filters 108 and improve the efficiency of the system 100 in generating permeate. A width of the membrane gap 110 may be at least two times larger than a smallest dimension of a biofilm carrier 116 of the plurality of biofilm carriers 116. The width of the membrane gap 110 may be at least 10 mm. The biological wastewater treatment system 102 may also have a mixer 118 that is configured to agitate the wastewater within the biological wastewater treatment system 102. The mixer 118 may be positioned within the biological wastewater treatment system 102. The mixer 118 may be a mechanical mixer, a pump or may be accomplished through gas introduction.

A wide variety of elemental selenium-biomass separation processes may be used to substantially separate elemental selenium from biomass and water. In one non-limiting embodiment, the elemental selenium-biomass separation process includes passing the waste sludge into a centrifuge 120 and spinning the centrifuge 120 to produce a selenium-rich biosolid and a centrate. In another embodiment, the elemental selenium separation process comprises the destruction of biomass through thermal oxidation. The biomass separated from the elemental selenium in the selenium recovery process may be returned to the bioreactor of the biological wastewater treatment system 102 where the macro-nutrients and micro-nutrients can be utilized again for biomass synthesis or discharged from the system. On the other hand, the selenium-rich biosolid that is harvested with the harvesting unit 104 may contain at least 10% elemental selenium. In some embodiments, the selenium-rich biosolid may contain at least 25% elemental selenium or at least 50% elemental selenium. The concentration of selenium within the selenium-rich biosolid may be dependent on the solids-residence time of the biomass within the system 100.

In some embodiments, the system for recovering elemental selenium from selenium-laden wastewater further comprises a biomass processing unit 106 (see FIGS. 1 and 2). The biomass processing unit 106 substantially reduces the total amount of biomass without reducing the amount of elemental selenium entrained in the biomass. In such embodiments, the biological wastewater treatment system 102 comprises an effluent carrying waste sludge into the biomass processing unit 106. Accordingly, the biological wastewater treatment system 102 has an additional influent source, which is the effluent from the biomass processing unit 106.

Once the waste sludge from the biological wastewater treatment system 102 is sent to a biomass processing unit 106, it is subject to physical, chemical, and/or biological treatments to produce a processed waste sludge. The processed waste sludge comprises elemental selenium and reduced mass when compared to the originating waste sludge. Pulsed electric fields may be applied to the waste sludge to reduce the total mass of the waste sludge without reducing the amount of elemental selenium suspended in the waste sludge. Alternatively, or in addition, conversions occurring in the biomass processing unit 106 include hydrolysis to rupture the biological cells and other particulate matter in the biomass, oxidation of organic matter, reduction of organic matter, or combinations thereof. In other embodiments, the biomass processing unit 106 treats waste sludge through ozonation, thermal hydrolysis, ultrasound, electrical fields, mechanical shearing, aerobic digestion, anaerobic digestion, or combinations thereof. The products of biomass destruction may include organic components that may be partially or fully biodegradable when returned to the biological wastewater treatment system 102. Macro-nutrients and micro-nutrients in the waste sludge will also be returned to the biological wastewater treatment system 102 where they can be utilized for biomass synthesis.

Effluent from the biomass processing unit 106, which comprises the processed waste sludge, may be returned, or recirculated, to the biological wastewater treatment system 102, where elemental selenium further agglomerates to produce a sludge with concentrated elemental selenium. Elemental selenium may be recovered from the sludge with concentrated elemental selenium using the harvesting unit 104, where the elemental selenium is separated from the biomass. The biomass separated from the elemental selenium in the selenium recovery process may be returned to the biological wastewater treatment system 102 where the macro-nutrients and micro-nutrients can be utilized again for biomass synthesis or discharged from the system 100. The system 100 may comprise a mixing chamber 122 where the influent wastewater, a portion of the processed waste sludge, and the centrate may be mixed and then passed into the biological wastewater treatment system 102, as shown in FIG. 2.

As a result of the above-described system 100, selenium may be recovered from wastewater as follows. Influent wastewater is provided to the biological wastewater treatment system 102. A waste sludge comprising biomass and elemental selenium is produced from the influent wastewater. Producing the waste sludge from the influent wastewater may comprise converting the selenium oxyanions into the elemental selenium. The waste sludge may be treated to reduce the total mass of the waste sludge without reducing the elemental selenium, thus producing a processed waste sludge. Before treating the waste sludge, the waste sludge may be passed to the biomass processing unit 106, and after treating the waste sludge, the processed waste sludge may be returned to the biological wastewater treatment system 102. Treating the waste sludge may also comprise at least one of hydrolysis, oxidation of organic matter, reduction of organic matter, ozonation, thermal hydrolysis, ultrasound, electrical fields, mechanical shearing, aerobic digestion, and anaerobic digestion. In some embodiments, a portion of the processed waste sludge is recirculated and mixed with the influent wastewater that is entering the biological wastewater treatment system 102. The elemental selenium may then be harvested form the processed waste sludge. Harvesting the elemental selenium may comprise passing the waste sludge into the centrifuge 120 and spinning the centrifuge 120 to produce a selenium-rich biosolid and a centrate. In some embodiments, the centrate is then mixed with the influent wastewater that is entering the biological wastewater treatment system 102. Although the above system 100 is described as receiving influent wastewater into the mixing chamber 122 or into the biological wastewater treatment system 102, wastewater may also be introduced to the process at any other point. For example, influent wastewater could also be introduced into the biomass processing unit 106 or into the harvesting unit 104.

The invention claimed is:

1. A selenium-recovery wastewater treatment system, comprising:

a mixing chamber configured to receive wastewater comprising selenium oxyanions from an inlet of the wastewater treatment system;

a bioreactor configured to receive the wastewater from the mixing chamber and process the wastewater, wherein the bioreactor and the mixing chamber are physically separate, wherein the bioreactor is partitioned into a first zone and a second zone, and wherein the bioreactor comprises a nonporous hollow-fiber membrane inoculated with bacteria in the presence of a gas;

a membrane filter configured to filter the wastewater and generate permeate, wherein the membrane filter comprises at least two membrane filters positioned within the second zone of the bioreactor and each of the at least two membrane filters is separated from adjacent membrane filters of the at least two membrane filters by a membrane gap;

a biomass processing unit fluidly coupled to the bioreactor and configured to receive waste sludge comprising biomass and elemental selenium from the bioreactor, treat the waste sludge, reduce a concentration of the biomass within the waste sludge, divide the treated waste sludge into a first portion and a second portion, and recirculate the second portion of the treated waste sludge back to the mixing chamber;

a harvesting unit fluidly coupled to the biomass processing unit and configured to receive the first portion of the treated waste sludge from the biomass processing unit, separate the first portion of the treated waste sludge into a selenium-rich biosolid and a centrate, and pass the centrate back to the mixing chamber, wherein the mixing chamber is configured to receive and mix the wastewater from the inlet, the second portion of the treated waste sludge, and the centrate; and a plurality of biofilm carriers suspended within the bioreactor surrounding the at least two membrane filters, wherein a width of the membrane gap is at least two times larger than a smallest dimension of a biofilm carrier of the plurality of biofilm carriers.

2. The system of claim 1, wherein the harvesting unit is a centrifuge configured to separate the treated waste sludge into the selenium-rich biosolid and the centrate.

3. The system of claim 1, wherein the selenium-rich biosolid contains at least 10% elemental selenium.

4. The system of claim 1, wherein the width of the membrane gap is at least 10 mm.

5. The system of claim 1, further comprising a mixer configured to agitate the wastewater within the bioreactor.

6. The system of claim 5, wherein the mixer is positioned within the bioreactor.

7. The system of claim 1, wherein the membrane filter is formed of a ceramic material.

8. A method of recovering selenium from wastewater comprising:

providing an influent wastewater comprising selenium oxyanions to a biological wastewater treatment system comprising a mixing chamber configured to receive the wastewater from an inlet of the wastewater treatment system;

producing a waste sludge from the influent wastewater, the waste sludge comprising biomass and elemental selenium;

treating the waste sludge to reduce a total mass of the waste sludge without reducing the elemental selenium to produce a processed waste sludge;

dividing the processed waste sludge into a first portion and a second portion;

recirculating the second portion of the processed waste sludge back to the mixing chamber;

separating the first portion of the processed waste sludge into a selenium-rich biosolid and a centrate;

passing the centrate back to the mixing chamber; and mixing the wastewater from the inlet, the second portion of the processed waste sludge, and the centrate in the mixing chamber;

wherein the biological wastewater treatment system further comprises:

a bioreactor configured to receive the mixture of wastewater, processed waste sludge, and centrate and produce the waste sludge, wherein the bioreactor and the mixing chamber are physically separate, the bioreactor is partitioned into a first zone and a second zone, and the bioreactor comprises a nonporous hollow-fiber membrane inoculated with bacteria in the presence of a gas;

at least two membrane filters positioned within the second zone of the bioreactor and configured to filter the influent wastewater to generate permeate, wherein each of the at least two membrane filters is separated from adjacent membrane filters of the at least two membrane filters by a membrane gap; and a plurality of biofilm carriers suspended within the bioreactor surrounding the at least two membrane filters, wherein a width of the membrane gap is at least two times larger than a smallest dimension of a biofilm carrier of the plurality of biofilm carriers.

9. The method of claim 8, further comprising mixing the wastewater and the plurality of biofilm carriers within the bioreactor.

10. The method of claim 8, further comprising scouring the at least two membrane filters with the plurality of biofilm carriers.

* * * * *